(12) United States Patent
Ichikawa

(10) Patent No.: US 11,485,232 B2
(45) Date of Patent: Nov. 1, 2022

(54) VEHICLE

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 17/162,361

(22) Filed: Jan. 29, 2021

(65) Prior Publication Data
US 2021/0237575 A1    Aug. 5, 2021

(30) Foreign Application Priority Data

Feb. 3, 2020 (JP) .............................. JP2020-016410

(51) Int. Cl.
| | | |
|---|---|---|
| *B60K 35/00* | (2006.01) | |
| *B60L 50/75* | (2019.01) | |
| *H01M 8/04537* | (2016.01) | |
| *H01M 10/48* | (2006.01) | |
| *H01M 16/00* | (2006.01) | |

(52) U.S. Cl.
CPC .............. *B60K 35/00* (2013.01); *B60L 50/75* (2019.02); *H01M 8/04619* (2013.01); *H01M 8/04626* (2013.01); *H01M 10/482* (2013.01); *H01M 10/488* (2013.01); *H01M 16/006* (2013.01); *B60K 2370/169* (2019.05); *H01M 2220/20* (2013.01); *H01M 2250/20* (2013.01)

(58) Field of Classification Search
CPC .... B60K 35/00; B60L 50/75; H01M 8/04619; H01M 8/04626; H01M 10/482; H01M 10/488; H01M 2250/20; H01M 2220/20

USPC ............................................................ 429/9
See application file for complete search history.

(56) References Cited

U.S. PATENT DOCUMENTS

| | | | |
|---|---|---|---|
| 2005/0128065 A1 | 6/2005 | Kolpasky et al. | |
| 2010/0194553 A1 | 8/2010 | Mizutani et al. | |
| 2011/0175569 A1* | 7/2011 | Austin | B60L 53/63 320/109 |
| 2012/0179313 A1* | 7/2012 | Hartl | B60W 50/14 701/1 |
| 2012/0316714 A1* | 12/2012 | Nagayanagi | B60L 7/18 701/1 |

(Continued)

FOREIGN PATENT DOCUMENTS

| | | |
|---|---|---|
| DE | 202018005150 U1 | 1/2019 |
| DE | 102019111037 A1 | 10/2019 |

(Continued)

*Primary Examiner* — James M Erwin
(74) *Attorney, Agent, or Firm* — Dinsmore & Shohl LLP

(57) ABSTRACT

An FCV includes: a driving device that generates traveling power by using at least one of electric power output from an FC system and electric power output from a battery; and a display device that presents a first indicator and a second indicator, the first indicator indicating a remaining amount of electric power to be output from the FC system, the second indicator indicating a remaining amount of electric power to be output from the battery. An amount of electric power that can be output from the FC system when the hydrogen tank is full is larger than an amount of electric power that can be output from the battery when the battery is fully charged. A presentation area of the first indicator is larger than a presentation area of the second indicator.

13 Claims, 18 Drawing Sheets

(56) References Cited

U.S. PATENT DOCUMENTS

| | | | |
|---|---|---|---|
| 2017/0203661 A1* | 7/2017 | Nishinaka | B60L 3/0061 |
| 2018/0204393 A1* | 7/2018 | Landolsi | B60L 58/10 |
| 2019/0329706 A1 | 10/2019 | Isaacs et al. | |

FOREIGN PATENT DOCUMENTS

| | | |
|---|---|---|
| JP | 2009-061921 A | 3/2009 |
| WO | 2012/175839 A1 | 12/2012 |

* cited by examiner

VEHICLE

CROSS REFERENCE TO RELATED APPLICATIONS

This nonprovisional application is based on Japanese Patent Application No. 2020-016410 filed on Feb. 3, 2020, with the Japan Patent Office, the entire contents of which are hereby incorporated by reference.

BACKGROUND

Field

The present disclosure relates to a vehicle.

Description of the Background Art

There has been proposed a vehicle that is driven using a fuel cell system and a power storage device. The fuel cell system includes a fuel tank that stores a fuel. The power storage device is chargeable with electric power supplied from outside. Japanese Patent Laying-Open No. 2009-61921 discloses such a vehicle, the vehicle including a display device that presents a remaining amount of fuel in a fuel cell system and a remaining amount of electric power in an power storage device.

SUMMARY

An amount of electric power that can be output from the fuel cell system when the fuel tank is full may be different from an amount of electric power that can be output from the power storage device when the power storage device is fully charged. In this case, in Japanese Patent Laying-Open No. 2009-61921, the following problem may occur: a user cannot recognize a difference between the amount of electric power that can be output from the fuel cell system when the fuel tank is full and the amount of electric power that can be output from the power storage device when the power storage device is fully charged.

The present disclosure has been made to solve the problem and has an object to allow a user to recognize a difference between an amount of electric power that can be output from a fuel cell system when a fuel tank is full and an amount of electric power that can be output from a power storage device when the power storage device is fully charged.

According to an aspect of the present disclosure, a vehicle includes: a fuel cell system including a fuel tank that stores a fuel; a power storage device chargeable with electric power supplied from outside; a driving device that generates traveling power by using at least one of electric power output from the fuel cell system and electric power output from the power storage device; and a display device that presents an indicator indicating a remaining amount of electric power to be output from the fuel cell system and an indicator indicating a remaining amount of electric power to be output from the power storage device. A first amount of electric power that is able to be output from the fuel cell system when the fuel tank is full is different from a second of electric power that is able to be output from the power storage device when the power storage device is fully charged. A presentation area of an indicator indicating a remaining amount of a larger amount of electric power of the first amount of electric power and the second amount of electric power is larger than a presentation area of an indicator indicating a remaining amount of a smaller amount of electric power of the first amount of electric power and the second amount of electric power.

According to such a configuration, the presentation area of the indicator indicating the remaining amount of the larger amount of electric power of the amount of electric power that can be output from the fuel cell system when the fuel tank is full and the amount of electric power that can be output from the power storage device when the power storage device is fully charged is larger than the presentation area of the indicator indicating the remaining amount of the smaller amount of electric power of the amount of electric power that can be output from the fuel cell system when the fuel tank is full and the amount of electric power that can be output from the power storage device when the power storage device is fully charged. Accordingly, the user can intuitively recognize a difference between the amount of electric power that can be output from the fuel cell system when the fuel tank is full and the amount of electric power that can be output from the power storage device when the power storage device is fully charged.

In a certain aspect, a first indicator and a second indicator are presented side by side, the first indicator serving as the indicator indicating the remaining amount of the larger amount of electric power, the second indicator serving as the indicator indicating the remaining amount of the smaller amount of electric power. The first indicator and the second indicator are presented to extend in a first direction.

According to such a configuration, the first indicator and the second indicator are presented side by side. Therefore, the remaining amount presented by the first indicator and the remaining amount presented by the second indicator can be easily viewable by the user.

In a certain aspect, the first indicator and the second indicator are presented side by side in a second direction orthogonal to the first direction. A length of the first indicator in the second direction orthogonal to the first direction is longer than a length of the second indicator in the second direction.

According to such a configuration, by way of a difference between the indicators in length in the direction orthogonal to the extending direction thereof, the user can recognize a difference between the amount of electric power that can be output from the fuel cell system when the fuel tank is full and the amount of electric power that can be output from the power storage device when the power storage device is fully charged.

In a certain aspect, the first indicator and the second indicator are presented side by side in a second direction orthogonal to the first direction. A length of the first indicator in the first direction is longer than a length of the second indicator in the first direction.

According to such a configuration, by way of a difference between the indicators in length in the extending direction thereof, the user can recognize a difference between the amount of electric power that can be output from the fuel cell system when the fuel tank is full and the amount of electric power that can be output from the power storage device when the power storage device is fully charged.

In a certain aspect, the first indicator includes a first gauge image that is decreased in response to a decrease in the remaining amount indicated by the first indicator. The second indicator includes a second gauge image that is decreased in response to a decrease in the remaining amount indicated by the second indicator. A zero position indicating a state with a value of 0 in the first gauge image coincides with a zero position indicating a state with a value of 0 in the second gauge image in a coordinate of the first direction.

According to such a configuration, the zero position indicating the state with a value of 0 in the first gauge image of the first indicator coincides with the zero position indicating the state with a value of 0 in the second gauge image of the second indicator. Therefore, the remaining amount indicated by the first gauge image and the remaining amount indicated by the second gauge image are easily viewable by the user.

In a certain aspect, the first indicator includes a first gauge image that is decreased in response to a decrease in the remaining amount indicated by the first indicator. The second indicator includes a second gauge image that is decreased in response to a decrease in the remaining amount indicated by the second indicator. The first indicator and the second indicator are presented side by side in the first direction. A length of the first indicator in the first direction is longer than a length of the second indicator in the first direction. A zero position indicating a state with a value of 0 in the first gauge image coincides with a zero position indicating a state with a value of 0 in the second gauge image in a coordinate of the first direction.

According to such a configuration, the first indicator and the second indicator can be presented as one indicator. Therefore, the presentation region of the indicator can be smaller than that in the "configuration in which the first indicator and the second indicator are presented as two indicators rather than one indicator".

In a certain aspect, the vehicle further includes: a first provision port via which the fuel is to be provided; and a second provision port provided at a position opposite to a position of the first provision port, the electric power being to be provided via the second provision port. The first indicator is presented on a side on which the first provision port is located. The second indicator is presented on a side on which the second provision port is located.

According to such a configuration, the user can recognize the position of the first provision port and the position of the second provision port by visually recognizing the first indicator and the second indicator.

In a certain aspect, the first indicator includes: a first gauge image that is decreased in response to a decrease in the remaining amount indicated by the first indicator; a first full position indicating a full state in the first gauge image; and a first zero position indicating a state with a value of 0 in the first gauge image. The second indicator includes: a second gauge image that is decreased in response to a decrease in the remaining amount indicated by the second indicator; a second full position indicating a full state in the second gauge image; and a second zero position indicating a state with a value of 0 in the second gauge image. The display device switches a manner of presentation of each of the first indicator and the second indicator in accordance with electric power used by the driving device.

According to such a configuration, the presentation positions of the first indicator and the second indicator are switched in accordance with the electric power used by the driving device in the electric power output from the fuel cell system and the electric power output from the power storage device. Hence, the user can recognize electric power that is being used.

In a certain aspect, when a first mode is set, the display device presents the first indicator and the second indicator side by side in the first direction, presents the first indicator on a left side as viewed from a user, and presents the second indicator on a right side as viewed from the user, the first mode being a mode in which the electric power having the remaining amount indicated by the first indicator is used with precedence over the electric power having the remaining amount indicated by the second indicator.

According to such a configuration, the user can recognize that the electric power having the remaining amount indicated by the first indicator is used with precedence over the electric power having the remaining amount indicated by the second indicator.

In a certain aspect, when a second mode is set, the display device presents the first indicator and the second indicator side by side in the first direction, presents the second indicator on a left side as viewed from a user, and presents the first indicator on a right side as viewed from the user, the second mode being a mode in which the electric power having the remaining amount indicated by the second indicator is used with precedence over the electric power having the remaining amount indicated by the first indicator.

According to such a configuration, the user can recognize that the electric power having the remaining amount indicated by the second indicator is used with precedence over the electric power having the remaining amount indicated by the first indicator.

In a certain aspect, when a third mode is set, the display device presents the first indicator and the second indicator side by side in a direction orthogonal to the first direction, the third mode being a mode in which both the electric power having the remaining amount indicated by the first indicator and the electric power having the remaining amount indicated by the second indicator are used.

According to such a configuration, the user can recognize that both the electric power having the remaining amount indicated by the first indicator and the electric power having the remaining amount indicated by the second indicator are used.

In a certain aspect, the fuel is hydrogen. The larger amount of electric power is the electric power to be output from the fuel cell system. The smaller amount of electric power is the electric power to be output from the power storage device. When a fourth mode is set, the display device presents an image indicating that the power storage device is charged by outputting the electric power from the fuel cell system, the fourth mode being a mode in which the power storage device is charged by outputting the electric power from the fuel cell system.

According to such a configuration, the user can recognize that the power storage device is provided with electric power based on the electric power output from the fuel cell system including the fuel tank that stores hydrogen.

In a certain aspect, the fuel is hydrogen. The larger amount of electric power is the electric power to be output from the fuel cell system. The smaller amount of electric power is the electric power to be output from the power storage device.

According to such a configuration, the above-described configuration can be appropriately applied to a vehicle in which an amount of electric power to be output from a fuel cell system including a fuel tank that stores hydrogen is larger than an amount of electric power to be output from a power storage device.

The foregoing and other objects, features, aspects and advantages of the present disclosure will become more apparent from the following detailed description of the present disclosure when taken in conjunction with the accompanying drawings.

DETAILED DESCRIPTION

Figure 1:
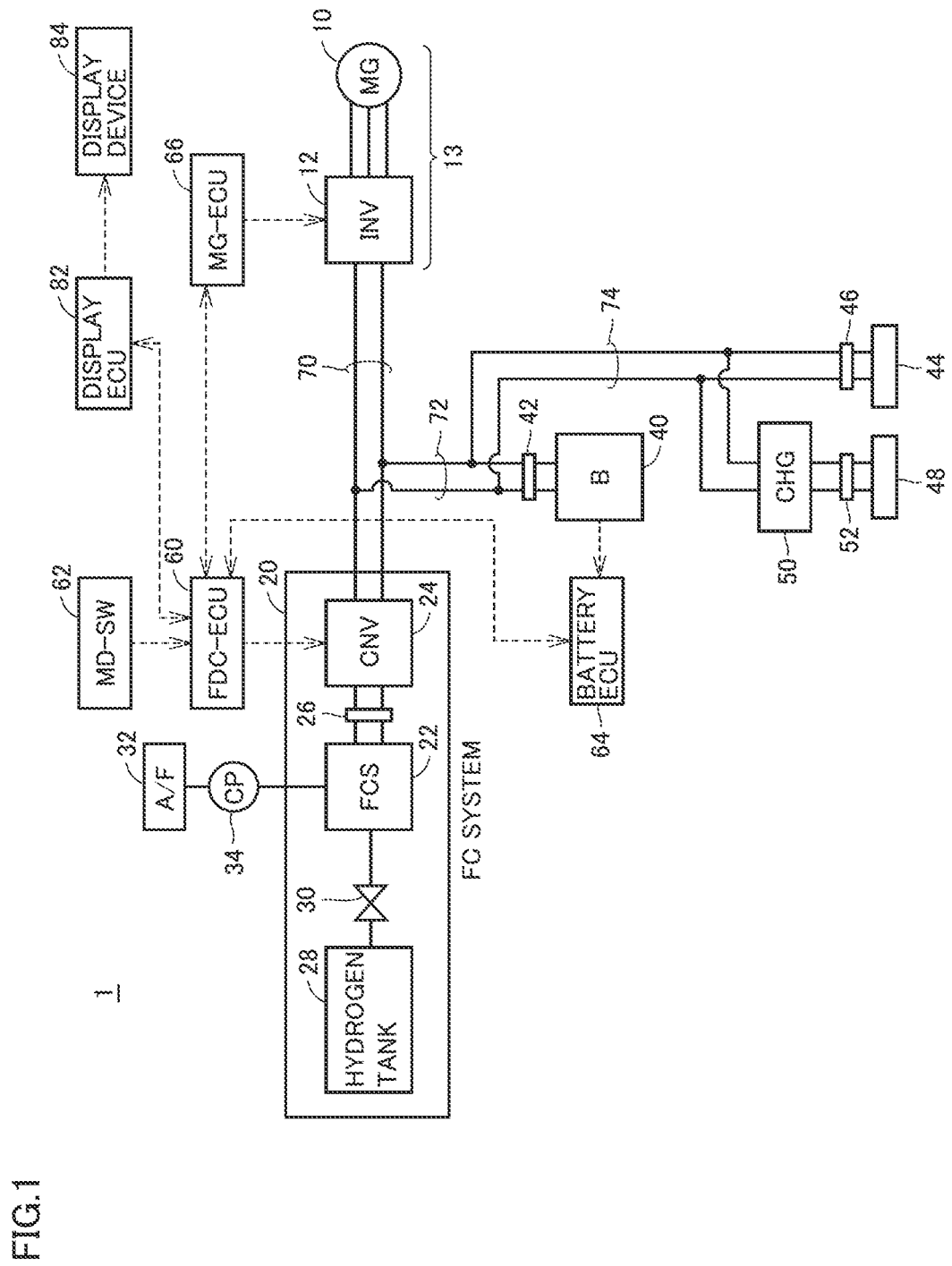
FIG. 1 is a diagram showing an overall configuration of an FCV according to a first embodiment of the present disclosure.

Hereinafter, embodiments of the present disclosure will be described in detail with reference to figures. It should be noted that in the figures, the same or corresponding portions are denoted by the same reference characters, and will not be described repeatedly. Further, it is originally expected to appropriately combine and use respective structures in the embodiments.

First Embodiment

FIG. 1 is a diagram showing an overall configuration of a FCV (fuel cell vehicle) 1 according to a first embodiment of the present disclosure. Referring to FIG. 1, FCV 1 includes a motor generator (hereinafter, referred to as "MG") 10, an inverter 12, an FC (fuel cell) system 20, a hydrogen tank 28, a supply valve 30, an air filter 32, and a compressor 34.

MG 10 is an AC rotating electric machine such as a three-phase AC synchronous electric motor having a rotor in which a permanent magnet is embedded. MG 10 is driven by inverter 12 to generate rotational driving force. The driving force generated by MG 10 is transmitted to driving wheels (for example, driving wheels 303 shown in FIG. 13). During braking of FCV 1 or the like, MG 10 is operated as a generator to generate electric power. The electric power generated by MG 10 can be rectified by inverter 12 and can be stored in battery 40.

Inverter 12 is provided between power line 70 and MG 10, and drives MG 10 based on a driving signal from an MG-ECU 66 (described later). Inverter 12 is constituted of, for example, a bridge circuit including switching elements for three phases.

FC system 20 includes an FC stack 22, a boost converter 24, a relay 26, hydrogen tank 28, and supply valve 30. FC stack 22 is a structure in which a plurality of (for example, several ten to several hundred) solid polymer type cells are stacked in series, for example. Each of the cells is formed, for example, by joining catalyst electrodes onto both surfaces of an electrolyte membrane and sandwiching them between electrically conductive separators. Each of the cells generates electric power by causing an electrochemical reaction between hydrogen supplied to an anode and oxygen (air) supplied to a cathode.

Boost converter 24 boosts the electric power generated by FC stack 22 based on a control signal from an FDC-ECU 60 (described later), and outputs the boosted electric power to power line 70. This electric power has a voltage of, for example, several hundred V. Relay 26 is provided in an electric path between FC stack 22 and boost converter 24. Relay 26 is opened when the vehicle system is non-operational or when FC system 20 is not in use.

Hydrogen tank 28 stores hydrogen as a fuel to be supplied to FC stack 22. Hydrogen tank 28 is a lightweight, high-strength and high-pressure tank including a carbon fiber reinforced plastic layer, for example. Hydrogen tank 28 can store hydrogen at several ten MPa, for example. Hydrogen is supplied from hydrogen tank 28 to FC stack 22 through supply valve 30. FCV 1 has a provision port. Hydrogen is provided via the provision port, and the provided hydrogen is stored in hydrogen tank 28. The provision port via which hydrogen is provided is, for example, a first provision port 301 shown in FIG. 13. It should be noted that hydrogen tank 28 corresponds to a "fuel tank" of the present disclosure. In the present embodiment, the fuel used for traveling of FCV 1 is "hydrogen", but a different fuel may be used as a modification.

Compressor 34 is a device for supplying oxygen to FC stack 22. Compressor 34 suctions oxygen (air) through air filter 32, compresses the oxygen, and supplies the compressed oxygen to FC stack 22.

FCV 1 further includes a battery 40, a DC (Direct Current) inlet 44, an AC (Alternate Current) inlet 48, a charger 50, and relays 42, 46, 52.

Battery 40 is a chargeable/dischargeable power storage device. Battery 40 includes an assembled battery including a plurality of battery cells (for example, several hundred cells). Each of the battery cells is, for example, a secondary battery such as a lithium ion battery or a nickel-metal hydride battery. It should be noted that the lithium ion secondary battery is a secondary battery in which lithium serves as a charge carrier. The lithium ion secondary battery may include not only a general lithium ion secondary battery employing a liquid electrolyte but also an all-solid-state battery employing a solid electrolyte. Instead of battery 40, a power storage element such as an electric double layer capacitor may be used.

Battery 40 is connected to a power line 72 via relay 42. Power line 72 is connected to power line 70. Battery 40 stores electric power for driving MG 10, and supplies electric power to inverter 12 through power lines 72, 70. Battery 40 is charged by receiving electric power generated by MG 10 during braking of FCV 1 or the like. Battery 40 can function as an energy buffer that absorbs load fluctuations caused by acceleration and deceleration of FCV 1 and that stores electric power generated by MG 10 during braking of FCV 1 or the like.

In the present embodiment, battery 40 can be charged by receiving electric power supplied from a power supply (not shown) external to the vehicle via DC inlet 44 or AC inlet 48 (hereinafter, the charging of battery 40 by the power supply external to the vehicle will be also referred to as "external charging"). The external charging is performed by providing electric power via a provision port. This provision port is, for example, a second provision port 302 shown in FIG. 13.

DC inlet 44 is connected to a power line 74 via relay 46, and power line 74 is connected to power line 72. DC inlet 44 can be engaged with a connector of a DC charging cable extending from a charging station or the like (not shown) external to the vehicle. DC inlet 44 receives high-voltage DC power supplied from the charging station or the like and outputs the high-voltage DC power to power line 74.

AC inlet 48 is connected to charger 50 via relay 52. AC inlet 48 can be engaged with a connector of an AC charging cable extending from a charging station or the like external to the vehicle. AC inlet 48 receives AC power (for example, system power) supplied from the charging station or the like and outputs the AC power to charger 50. Charger 50 is connected to power line 74, and converts the AC power received from AC inlet 48 into electric power having a voltage level for battery 40, and outputs the converted electric power to power line 74.

Relay 42 is provided between battery 40 and power line 72, and is closed during system startup of FCV 1 or during execution of external charging. Relay 46 is provided between DC inlet 44 and power line 74, and is closed when external charging (for example, DC charging) is performed using DC inlet 44. Relay 52 is provided between AC inlet 48 and charger 50, and is closed when external charging (AC charging) is performed using AC inlet 48 and charger 50.

Thus, FCV 1 is a plug-in FCV in which battery 40 is chargeable using a power supply external to the vehicle and connected to DC inlet 44 or AC inlet 48. FCV 1 can travel using electric power stored in battery 40 as a result of external charging.

FCV 1 further includes an FDC-ECU (Electronic Control Unit) 60, a mode switch (MD-SW) 62, a battery ECU 64, and an MG-ECU 66. Each of FDC-ECU 60, battery ECU 64, MG-ECU 66, and a below-described display ECU 82 includes a CPU (Central Processing Unit), a memory (ROM (Read Only Memory) and RAM (Random Access Memory)), and an input/output buffer (each not shown). The CPU loads a program stored in the ROM into a RAM or the like and executes the program. In the program stored in the ROM, a process to be performed by a corresponding ECU is written.

Hereinafter, MG 10 and inverter 12 may be referred to as a "driving device 13". Power generated by driving device 13 is also referred to as "traveling power". FCV 1 travels based on the traveling power.

FDC-ECU 60 calculates an output requested for FC system 20 (output electric power of FC system 20), based on the traveling power requested for FCV 1 and a charging/discharging request for battery 40. FDC-ECU 60 controls boost converter 24 to cause FC system 20 to output the calculated electric power. It should be noted that the traveling power requested for FCV 1 is calculated based on an amount of operation on an accelerator pedal, a vehicle speed, or the like. In the first embodiment, the traveling power is calculated by FDC-ECU 60, but may be calculated by a different ECU (for example, a vehicle ECU (not shown) that generally controls the whole of the vehicle).

FDC-ECU 60 switches the traveling mode in accordance with a setting made by way of mode switch 62. FCV 1 includes FC system 20 and battery 40 as power supplies, and electric power can be stored in battery 40. In FCV 1 according to the first embodiment, there are four traveling modes corresponding to manners of use of FC system 20 and battery 40. A user can select a traveling mode by operating mode switch 62. Mode information indicating the traveling mode selected by way of mode switch 62 is stored in, for example, the RAM of FDC-ECU 60. FDC-ECU 60 can specify the set traveling mode based on the mode information stored in the RAM.

Further, FDC-ECU 60 can recognize a remaining amount of electric power in FC system 20 and a remaining amount of electric power in battery 40.

Mode switch 62 is a switch for allowing the user to set a traveling mode. Mode switch 62 may be a dedicated switch or may be formed in a touch panel display of a navigation device or the like.

Battery ECU 64 monitors voltage, current, temperature, and the like of battery 40. The voltage, current, temperature, and the like of battery 40 are detected by various types of sensors (not shown). Battery ECU 64 calculates an SOC (State Of Charge) of battery 40 based on the detected values of the voltage, current, temperature, and the like of battery 40. The calculated SOC value is transmitted to FDC-ECU 60. It should be noted that the SOC may be calculated by FDC-ECU 60 based on the detected values of the voltage, current, temperature, and the like of battery 40.

In FCV 1, battery 40 is connected to power line 70 not via a converter. Basically, an amount of charging/discharging of battery 40 is determined by a difference between the traveling power requested by inverter 12 and MG 10 and the output of FC system 20. Therefore, by controlling the output of FC system 20 by FDC-ECU 60 based on the traveling power, the charging/discharging and SOC of battery 40 can be controlled.

In FCV 1 according to the first embodiment, a target SOC indicating a target value of SOC is calculated by FDC-ECU 60 in accordance with a traveling mode. A requested amount of charging/discharging of battery 40 is calculated based on a deviation between the SOC and the target SOC so as to attain an SOC of battery 40 close to the target SOC. Based on the calculated requested amount of charging/discharging and the traveling power, the output of FC system 20 is controlled by FDC-ECU 60.

It should be noted that as a method for calculating an SOC, various known methods can be used such as: a method employing an OCV-SOC curve (map or the like) indicating a relation between an OCV (Open Circuit Voltage) and an SOC; and a method employing an integrated value of current input to and output from battery 40.

From FDC-ECU 60, MG-ECU 66 receives a calculated value of the traveling power requested for FCV 1. MG-ECU 66 generates, based on the traveling power, a signal for driving MG 10 using inverter 12, and outputs the signal to inverter 12.

FCV 1 further includes display ECU 82 and a display device 84. Display ECU 82 controls presentation of display device 84. Display ECU 82 is also referred to as a "display control device". Display device 84 is installed, for example, at a position directly facing a driver of FCV 1. Display device 84 presents various pieces of information. Display device 84 presents a below-described indicator, for example. Display ECU 82 controls presentation of display device 84 under control of FDC-ECU 60. It should be noted that in the description below, a person on FCV 1 (including a driver of FCV 1) is also referred to as a "user".

<Description of Traveling Modes>

As described above, FCV 1 includes FC system 20 and battery 40. In FCV 1 according to the first embodiment, the four traveling modes are provided to correspond to the respective manners of using FC system 20 and battery 40.

Figure 2:
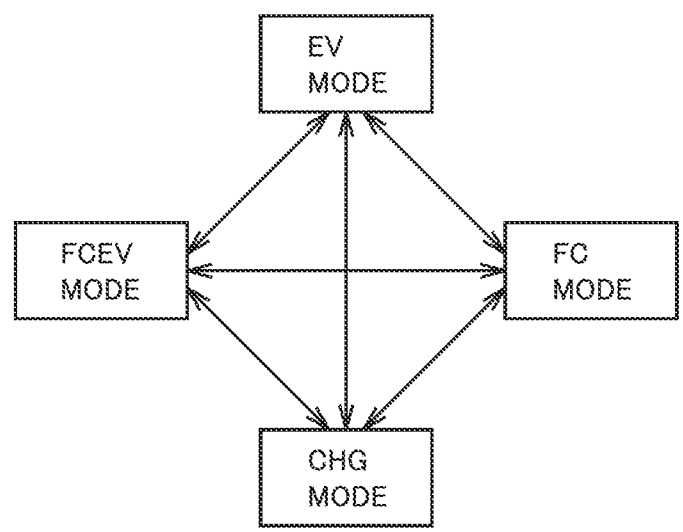
FIG. 2 is a diagram showing traveling modes provided in the FCV.

FIG. 2 is a diagram showing the traveling modes provided in FCV 1. Referring to FIG. 2, FCV 1 according to the first embodiment has the following four traveling modes: an "FC mode", an "FCEV mode", an "EV (Electric Vehicle) mode", and a "CHG mode (charge mode)". The user of FCV 1 can select a desired traveling mode from these traveling modes by way of mode switch 62. The FC mode corresponds to a "first mode", the EV mode corresponds to a "second mode", the FCEV mode corresponds to a "third mode", and the CHG mode corresponds to a "fourth mode".

Figure 3:
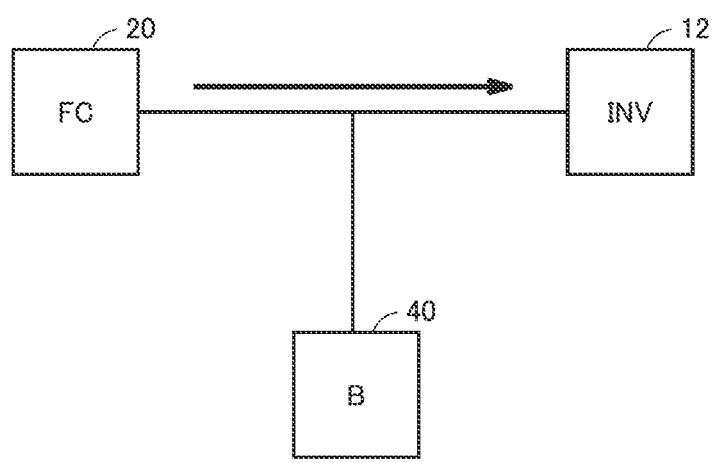
FIG. 3 is a diagram showing a basic flow of supply of electric power in an FC mode.

FIG. 3 is a diagram showing a basic flow of supply of electric power in the FC mode. Referring to FIG. 3, the FC mode is a traveling mode in which FCV 1 basically travels only using the output of FC system 20 until the fuel (hydrogen) of FC system 20 runs out. It should be noted that after the fuel runs out, FCV 1 travels only using the output of battery 40.

In the FC mode, FC system 20 (boost converter 24) is controlled by FDC-ECU 60 based on the power required by inverter 12, i.e., the traveling power (requested value) so as to cause FC system 20 to output power comparable to the traveling power.

It should be noted that even in the FC mode, when large traveling power is requested by the accelerator pedal being pressed down greatly or the like and the traveling power exceeds an output upper limit Wfc of FC system 20, electric power corresponding to an amount of shortage in the power is provided from battery 40. That is, the FC mode is a mode in which the electric power output from FC system 20 is used with precedence over the electric power output from battery 40. When regenerative power generation by MG 10 is performed during braking of FCV 1 or the like, the electric power generated by MG 10 is supplied from inverter 12 to battery 40. It should be noted that when the SOC of battery 40 has reached the upper limit, no regenerative power generation by MG 10 is performed.

Figure 4:
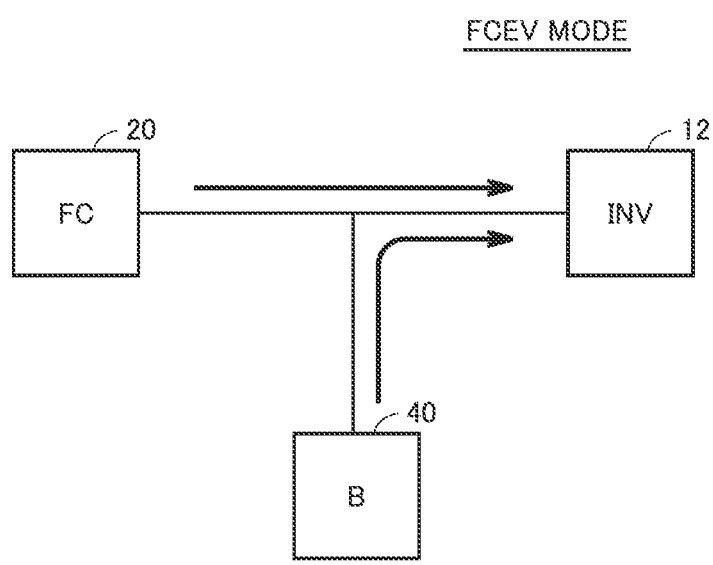
FIG. 4 is a diagram showing a basic flow of supply of electric power in an FCEV mode.

FIG. 4 is a diagram showing a basic flow of supply of electric power in the FCEV mode. Referring to FIG. 4, the FCEV mode is a characteristic traveling mode in FCV 1 according to the first embodiment, and is a hybrid mode in which both the output of FC system 20 and the output of battery 40 are used in a well-balanced manner.

Figure 5:
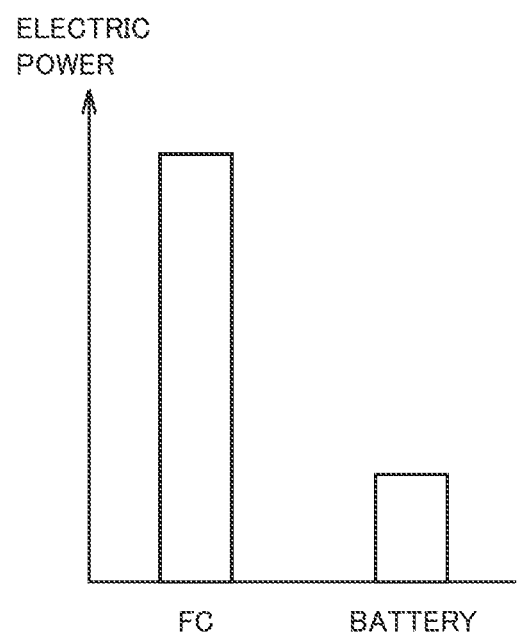
FIG. 5 is a diagram showing a comparison between hydrogen energy and energy of electric power stored in a battery.

FIG. 5 is a diagram for illustrating an amount of electric power. "FC" in FIG. 5 is represented by a bar graph showing an amount of electric power (i.e., the maximum amount of electric power) that can be output from FC system 20 when hydrogen tank 28 is full of hydrogen. "BATTERY" in FIG. 5 is represented by a bar graph showing an amount of electric power (i.e., the maximum amount of electric power) that can be output from the battery when battery 40 is fully charged. In the present embodiment, the maximum amount of electric power that can be output from FC system 20 is larger than the maximum amount of electric power that can be output from battery 40. The amount of electric power that can be output from FC system 20 corresponds to a "first amount of electric power". The amount of electric power that can be output from battery 40 corresponds to a "second amount of electric power".

Figure 6:
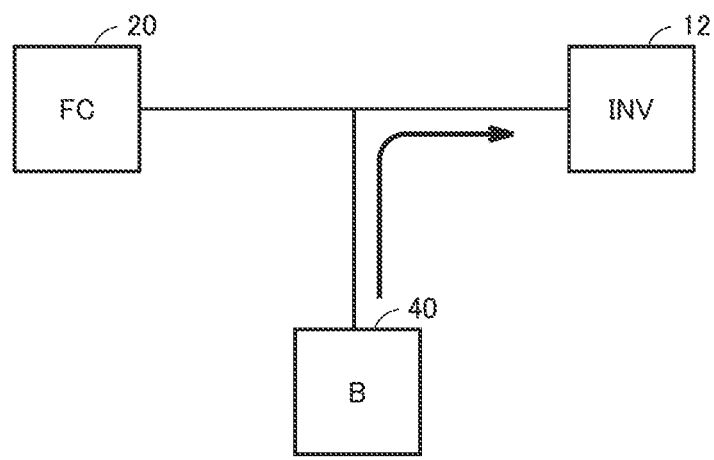
FIG. 6 is a diagram showing a basic flow of supply of electric power in an EV mode.

FIG. 6 is a diagram showing a basic flow of supply of electric power in the EV mode. Referring to FIG. 6, the EV mode is a traveling mode in which the vehicle basically travels using the output of battery 40 without using the fuel (hydrogen) of FC system 20.

It should be noted that even in the EV mode, when large traveling power is requested by the accelerator pedal being pressed down greatly or the like and the traveling power exceeds an output upper limit Wout of battery 40, electric power corresponding to an amount of shortage in the power is provided from FC system 20. That is, the EV mode is a mode in which the electric power output from battery 40 is used with precedence over the electric power output from FC system 20. When regenerative power generation by MG 10 is performed during braking of FCV 1 or the like, the electric power generated by MG 10 is supplied from inverter 12 to battery 40.

Figure 7:
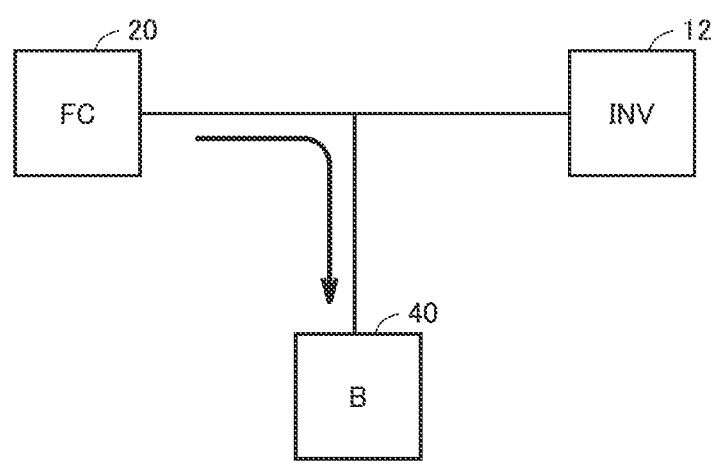
FIG. 7 is a diagram showing a basic flow of supply of electric power in a CHG mode.

FIG. 7 is a diagram showing a basic flow of supply of electric power in the CHG mode. Referring to FIG. 7, the CHG mode is a mode in which the SOC of battery 40 is increased to a predetermined level by actively charging battery 40 using the output of FC system 20 when the SOC of battery 40 is low. In other words, the CHG mode is a mode in which battery 40 is provided with electric power based on the electric power output from FC system 20.

It should be noted that even in the CHG mode, when traveling power is requested by the accelerator pedal being pressed down or the like, electric power is supplied from FC system 20 to inverter 12. Further, when large traveling power is requested by the accelerator pedal being pressed down greatly or the like, electric power is supplied also from battery 40 to inverter 12. When regenerative power generation by MG 10 is performed during braking of FCV 1 or the like, the electric power generated by MG 10 is supplied from inverter 12 to battery 40.

As apparent from the above description of the four modes, driving device 13 generates traveling power by using at least one of the electric power output from FC system 20 and the electric power output from battery 40.

[As to Presentation by Display Device]

Next, indicators presented by display device 84 will be described. The indicators of the present embodiment indicate a remaining amount of electric power that can be output from FC system 20 and a remaining amount of electric power that can be output from battery 40. Thus, the user can recognize both the remaining amount of the amount of electric power that can be output from FC system 20 and the remaining amount of the amount of electric power that can be output from battery 40. In the description below, the electric power that can be output from FC system 20 is referred to as "FC power" and the remaining amount of FC power is referred to as "FC remaining amount". The electric power that can be output from battery 40 is referred to as "battery power" and the remaining amount of battery power is referred to as "battery remaining amount". It should be noted that in each of the first embodiment and below-described second to fourth embodiments, display device 84 presents a first indicator 101 and a second indicator 102 in the same manner of presentation regardless of a set mode.

Figure 8:
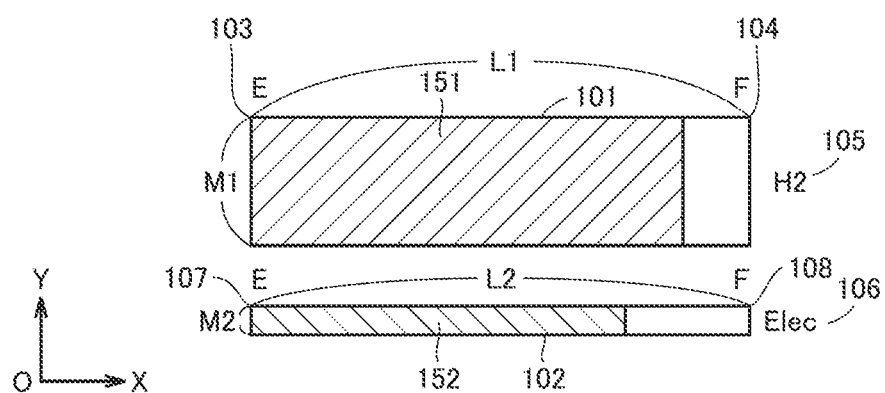
FIG. 8 shows exemplary indicators presented by a display device according to the first embodiment.

FIG. 8 shows exemplary indicators presented by display device 84 according to the present embodiment. In FIG. 8, the height direction of each of the indicators is defined as a "Y axis direction". A direction orthogonal to the Y axis direction is defined as an "X axis direction". Although the X axis and the Y axis are shown in FIG. 8 to facilitate understanding of the description, display device 84 does not actually present the X axis and the Y axis. The X axis direction corresponds to a "first direction" and the Y axis direction corresponds to a "second direction".

In the present embodiment, first indicator 101 and second indicator 102 are presented. First indicator 101 indicates the FC remaining amount. Second indicator 102 indicates the battery remaining amount.

First indicator 101 and second indicator 102 extend in the same direction. In the example of FIG. 8, the extending directions of first indicator 101 and second indicator 102 are the X axis direction. In the example of FIG. 8, first indicator 101 and second indicator 102 are presented side by side in a direction (i.e., the Y axis direction) orthogonal to the same direction.

A first gauge image 151 is presented in first indicator 101. First gauge image 151 is an image that is changed in response to an increase or decrease in the FC remaining amount. In the example of FIG. 8, first gauge image 151 is changed to be increased in the positive direction of the X axis in response to an increase in the FC remaining amount due to supply of hydrogen. On the other hand, first gauge image 151 is changed to be decreased in the negative direction of the X axis in response to a decrease in the FC remaining amount due to traveling of FCV 1 or the like. It should be noted that the shape of first indicator 101 is not changed in response to an increase or decrease in the FC remaining amount. The positive direction of the X axis direction is the "rightward direction" as viewed from the user. The negative direction of the X axis direction is the "leftward direction" as viewed from the user.

A second gauge image 152 is presented in second indicator 102. Second gauge image 152 is an image that is changed in response to an increase or decrease in the battery remaining amount. In the example of FIG. 8, second gauge image 152 is changed to be increased in the positive direction of the X axis in response to an increase in the battery remaining amount due to charging of battery 40. On the other hand, second gauge image 152 is changed to be decreased in the negative direction of the X axis in response to a decrease in the battery remaining amount due to traveling of FCV 1 or the like. It should be noted that the shape of second indicator 102 is not changed in response to an increase or decrease in the battery remaining amount.

In the present embodiment, FDC-ECU 60 can specify the FC remaining amount based on the amount of hydrogen stored in hydrogen tank 28. Further, FDC-ECU 60 can specify the battery remaining amount based on the SOC of battery 40. FDC-ECU 60 transmits the FC remaining amount and the battery remaining amount to display ECU 82. Display ECU 82 updates the presentations of first gauge image 151 and second gauge image 152 based on the transmitted FC remaining amount and battery remaining amount. The updating of the presentation of first gauge image 151 includes "changing first gauge image 151 to increase first gauge image 151" and "changing first gauge image 151 to decrease first gauge image 151". The updating of the presentation of second gauge image 152 includes "changing second gauge image 152 to increase second gauge image 152" and "changing second gauge image 152 to decrease second gauge image 152".

First indicator 101 extends from a zero position 103 to a full position 104. Zero position 103 represents a position indicating a state with a value of 0 in first gauge image 151. That is, when electric power cannot be output from FC system 20 because there is no fuel (hydrogen) in FC system 20, first gauge image 151 is not presented. The expression "first gauge image 151 is not presented" can be expressed as "first gauge image 151 is presented at zero position 103". Moreover, zero information is presented at zero position 103. The zero information is an image indicating that there is no fuel (hydrogen) in FC system 20. In the example of FIG. 8, the zero information is represented by the text "E".

Full position 104 represents a position indicating a full state in first gauge image 151. That is, when FC system 20 is full of fuel (hydrogen), first gauge image 151 is presented at full position 104. In other words, first gauge image 151 is presented in the entire region of first indicator 101. Moreover, full information is presented at full position 104. The full information is an image indicating that FC system 20 is full of fuel (hydrogen). In the example of FIG. 8, the full information is represented by the text "F".

Second indicator 102 extends from a zero position 107 to a full position 108. Zero position 107 represents a position indicating a state with a value of 0 in second gauge image 152. That is, second gauge image 152 is not presented when electric power cannot be output from battery 40 because there is no electric power stored in battery 40. The expression "second gauge image 152 is not presented" can be expressed as "second gauge image 152 is presented at zero position 107". Moreover, zero information is presented at zero position 107. The zero information is an image indicating that there is no electric power stored in battery 40. In the example of FIG. 8, the zero information is represented by the text "E".

Full position 108 represents a position indicating a full state in second gauge image 152. That is, when battery 40 is fully charged, second gauge image 152 is presented at full position 108. In other words, second gauge image 152 is presented in the entire region of second indicator 102. Moreover, full information is presented at full position 108. The full information is an image indicating that battery 40 is fully charged. In the example of FIG. 8, the full information is the text "F".

In the example of FIG. 8, a length L1 of first indicator 101 in the X axis direction is the same as a length L2 of second indicator 102 in the X axis direction. Hence, zero position 103 of first indicator 101 and zero position 107 of second indicator 102 are the same in the X axis. In other words, zero position 103 of first indicator 101 and zero position 107 of second indicator 102 have the same X axis coordinate. Full position 104 of first indicator 101 and full position 108 of second indicator 102 are the same in the X axis. In other words, full position 104 of first indicator 101 and full position 108 of second indicator 102 have the same X axis coordinate.

A length M1 of first indicator 101 in the Y axis direction is longer than a length M2 of second indicator 102 in the Y axis direction. Therefore, the area of the presentation region of first indicator 101 is larger than the area of the presentation region of second indicator 102.

Identification information 105 is presented for first indicator 101. In the present embodiment, identification information 105 is information for allowing the user to intuitively recognize a source of supply of energy to driving device 13. In the example of FIG. 8, identification information 105 is represented by the text "H2". "H2" is text representing hydrogen. Therefore, identification information 105 is text for allowing the user to identify "the source of supply of energy to driving device 13 is FC system 20". In the example of FIG. 8, identification information 105 is presented in the vicinity of first indicator 101.

Identification information 106 is presented for second indicator 102. In the present embodiment, identification information 106 is information for allowing the user to intuitively recognize the source of supply of energy to driving device 13. In the example of FIG. 8, identification information 106 is the text "Elec". Therefore, identification information 106 is text for allowing the user to identify "the source of supply of energy to driving device 13 is battery 40". In the example of FIG. 8, identification information 106 is presented in the vicinity of second indicator 102.

[Conclusion]

(1) FCV 1 of the present embodiment includes: FC system 20 including hydrogen tank 28 that stores hydrogen; and battery 40 chargeable with electric power supplied from outside. Further, driving device 13 generates traveling power by using at least one of electric power output from FC system 20 and electric power output from battery 40. Display device 84 presents first indicator 101 indicating the remaining amount of electric power to be output from FC system 20 and second indicator 102 indicating the remaining amount of electric power to be output from battery 40. As shown in FIG. 5, the amount of electric power that can be output from FC system 20 when hydrogen tank 28 is full is larger than an amount of electric power that can be output from battery 40 when battery 40 is fully charged. As shown in FIG. 8, the presentation area of first indicator 101 is larger than the presentation area of second indicator 102.

According to such a configuration, the user can intuitively recognize that FC system 20 has a larger amount of electric power that can be output than that of battery 40.

(2) As shown in FIG. 8, first indicator 101 and second indicator 102 are presented side by side. First indicator 101 and second indicator 102 are presented to extend in the same direction (the X axis direction in the example of FIG. 8). According to such a configuration, the user can visually recognize the remaining amount of electric power in FC system 20 and the remaining amount of electric power in battery 40 by comparing the remaining amount of electric power in FC system 20 and the remaining amount of electric power in battery 40.

(3) As shown in FIG. 8, first indicator 101 and second indicator 102 are presented side by side in the Y axis direction. Length L1 of first indicator 101 in the X axis direction is the same as length L2 of second indicator 102 in the X axis direction. As shown in FIG. 8, length M1 of first indicator 101 in the Y axis direction is longer than length M2 of second indicator 102 in the Y axis direction. According to such a configuration, since length M1 of first indicator 101 in the Y axis direction is longer than length M2 of second indicator 102 in the Y axis direction, the user can intuitively recognize that FC system 20 has a larger amount of electric power that can be output than that of battery 40.

(4) As shown in FIG. 8, zero position 103 indicating the state with a value of 0 in first gauge image 151 coincides with zero position 107 indicating the state with a value of 0 in second gauge image 152 in the X axis coordinate system. Hence, the user can visually recognize zero position 103 of first gauge image 151 and zero position 107 of second gauge image 152 at the same time, with the result that the FC remaining amount and the battery remaining amount are easily viewable by the user.

(5) As shown in FIG. 5, the amount of electric power that can be output from FC system 20 when hydrogen tank 28 is full of hydrogen is larger than the amount of electric power that can be output from battery 40 when battery 40 is fully charged. Therefore, the configuration described in the present embodiment can be suitably employed for an FCV 1 in which an amount of electric power to be output from a fuel cell system is larger than an amount of electric power to be output from a power storage device.

Second Embodiment

Figure 9:
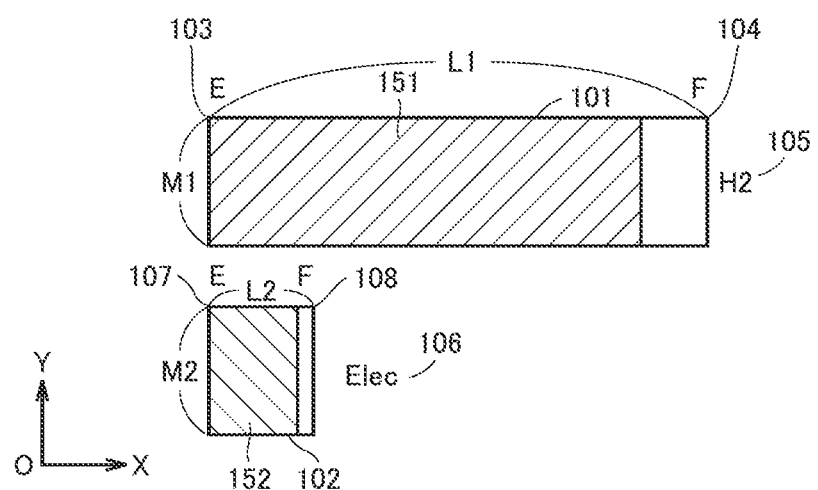
FIG. 9 shows exemplary indicators presented by a display device according to a second embodiment.

FIG. 9 is a diagram showing exemplary first indicator 101 and second indicator 102 according to a second embodiment. In the first embodiment, it has been described that length L1 of first indicator 101 in the X axis direction is the same as length L2 of second indicator 102 in the X axis direction, whereas length M1 of first indicator 101 in the Y axis direction is longer than length M2 of second indicator 102 in the Y axis direction.

In the second embodiment, as shown in FIG. 9, first indicator 101 and second indicator 102 are presented side by side in the Y axis direction. Further, in the second embodiment, length M1 of first indicator 101 in the Y axis direction is the same as length M2 of second indicator 102 in the Y axis direction. On the other hand, length L1 of first indicator 101 in the X axis direction is longer than length L2 of second indicator 102 in the X axis direction. Therefore, also in the second embodiment, the area of the presentation region of first indicator 101 is larger than the area of the presentation region of second indicator 102.

As shown in FIG. 9, zero position 103 of first indicator 101 and zero position 107 of second indicator 102 are the same in the X axis. In other words, zero position 103 of first indicator 101 and zero position 107 of second indicator 102 have the same X axis coordinate.

According to such a configuration, since length L1 of first indicator 101 in the X axis direction is longer than length L2 of second indicator 102 in the X axis direction, the user can intuitively recognize that FC system 20 has a larger amount of electric power that can be output than that of battery 40.

As shown in FIG. 9, zero position 103 indicating a state with a value of 0 in first gauge image 151 coincides with zero position 107 indicating a state with a value of 0 in second gauge image 152 in the X axis coordinate system. Hence, the user can visually recognize zero position 103 of first gauge image 151 and zero position 107 of second gauge image 152 at the same time, with the result that the FC remaining amount and the battery remaining amount are easily viewable by the user.

Third Embodiment

Figure 10:
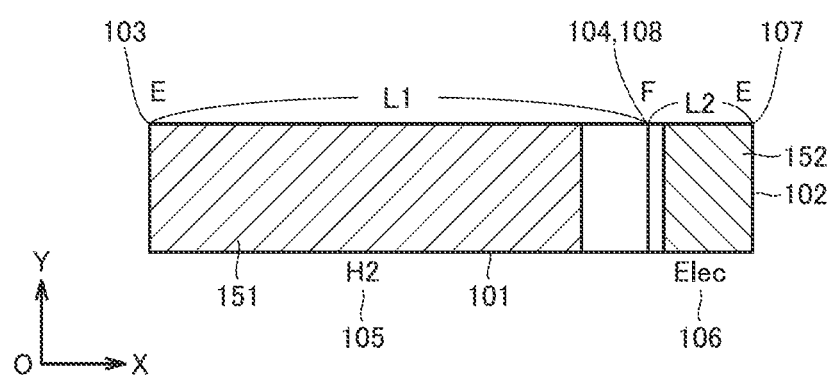
FIG. 10 shows exemplary indicators presented by a display device according to a third embodiment.

FIG. 10 is a diagram showing exemplary first indicator 101 and second indicator 102 according to a third embodiment. In the first embodiment, it has been described that first indicator 101 and second indicator 102 are presented side by side in the Y axis direction. In the third embodiment, as shown in FIG. 10, first indicator 101 and second indicator 102 are presented side by side in the X axis direction.

In the example of FIG. 10, first gauge image 151 is changed to be increased in the positive direction of the X axis in response to an increase in the FC remaining amount due to supply of hydrogen. On the other hand, first gauge image 151 is changed to be decreased in the negative direction of the X axis in response to a decrease in the FC remaining amount due to traveling of FCV 1 or the like. Further, second gauge image 152 is changed to be increased in the negative direction of the X axis in response to an increase in the battery remaining amount due to charging of battery 40. On the other hand, second gauge image 152 is changed to be decreased in the positive direction of the X axis in response to a decrease in the battery remaining amount due to traveling of FCV 1 or the like.

Further, in the example of FIG. 10, the coordinate of full position 104 of first indicator 101 in the X axis direction coincides with the coordinate of full position 108 of second indicator 102 in the X axis direction.

As shown in FIG. 10, display device 84 of the third embodiment can present first indicator 101 and second indicator 102 as one indicator. Therefore, the presentation region of the indicator can be smaller than that in the "configuration in which first indicator 101 and second indicator 102 are presented as two indicators rather than one indicator".

Figure 11:
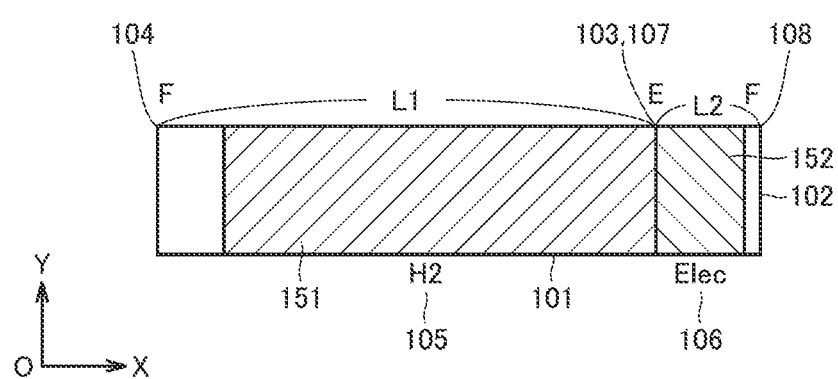
FIG. 11 shows exemplary indicators presented by a display device according to a first modification of the third embodiment.

FIG. 11 is a diagram showing exemplary first indicator 101 and second indicator 102 in a first modification of the third embodiment. In the first modification, first gauge image 151 is changed to be increased in the negative direction of the X axis in response to an increase in the FC remaining amount due to supply of hydrogen. On the other hand, first gauge image 151 is changed to be decreased in the positive direction of the X axis in response to a decrease in the FC remaining amount due to traveling of FCV 1 or the like. Further, second gauge image 152 is changed to be increased in the positive direction of the X axis in response to an increase in the battery remaining amount due to the charging of battery 40. On the other hand, second gauge image 152 is changed to be decreased in the negative direction of the X axis in response to a decrease in the battery remaining amount due to traveling of FCV 1 or the like.

Further, in the example of FIG. 11, the coordinate of zero position 103 of first indicator 101 in X axis direction coincides with the coordinate of zero position 107 of second indicator 102 in the X axis direction. Also when the indicators are presented in such a manner as shown in FIG. 11, first indicator 101 and second indicator 102 can be presented as one indicator. Therefore, the presentation region of the indicator can be smaller than that in the "configuration in which first indicator 101 and second indicator 102 are presented as two indicators rather than one indicator".

Figure 12:
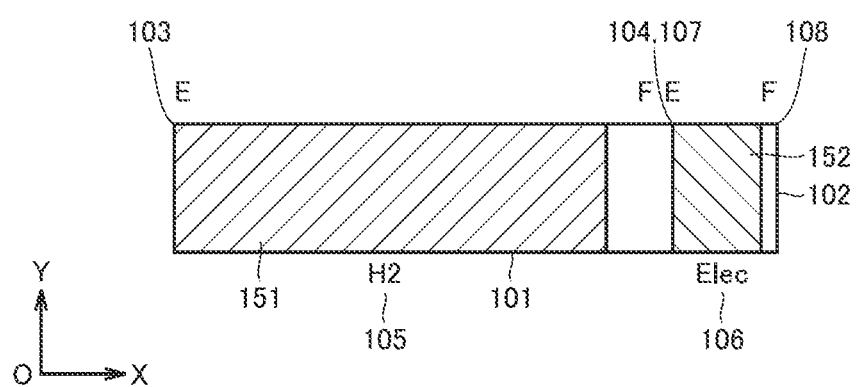
FIG. 12 shows exemplary indicators presented by a display device according to a second modification of the third embodiment.

FIG. 12 is a diagram showing exemplary first indicator 101 and second indicator 102 according to a second modification of the third embodiment. In the second modification, first gauge image 151 is changed to be increased in the positive direction of the X axis in response to an increase in the FC remaining amount due to supply of hydrogen. On the other hand, first gauge image 151 is changed to be decreased in the negative direction of the X axis in response to a decrease in the FC remaining amount due to traveling of FCV 1 or the like. Further, second gauge image 152 is changed to be increased in the positive direction of the X axis in response to an increase in the battery remaining amount due to charging of battery 40. On the other hand, second gauge image 152 is changed to be decreased in the negative direction of the X axis in response to a decrease in the battery remaining amount due to traveling of FCV 1 or the like.

Further, in the example of FIG. 12, the coordinate of full position 104 of first indicator 101 in the X axis direction coincides with the coordinate of zero position 107 of second indicator 102 in the X axis direction. Also when the indicators are presented in such a manner as shown in FIG. 12, first indicator 101 and second indicator 102 can be presented as one indicator. Therefore, the presentation region of the indicator can be smaller than that in the "configuration in which first indicator 101 and second indicator 102 are presented as two indicators rather than one indicator".

Fourth Embodiment

Figure 13:
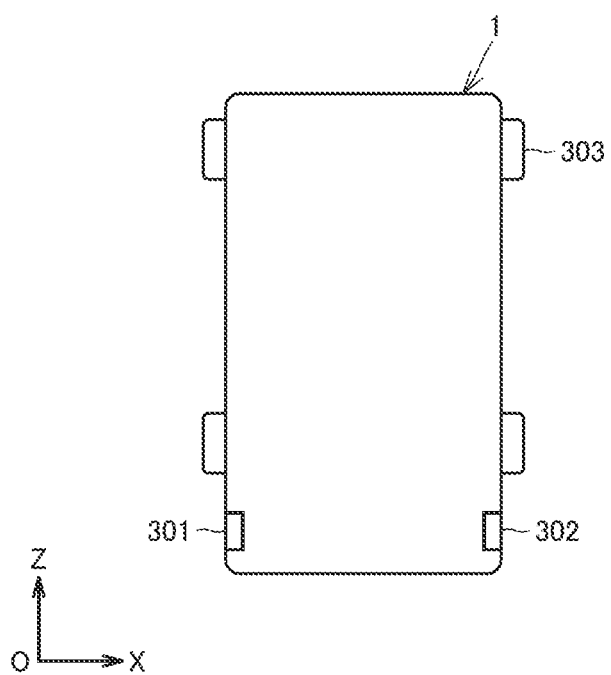
FIG. 13 is a simplified diagram of FCV as viewed from above.

FIG. 13 is a simplified diagram of FCV 1 according to a fourth embodiment as viewed from above. FCV 1 has four driving wheels 303. Further, as described in the first embodiment, FCV 1 includes first provision port 301 and second provision port 302. As described in the first embodiment, first provision port 301 is a provision port via which hydrogen is to be provided to hydrogen tank 28. Second provision port 302 is a provision port via which electric power is to be provided to battery 40.

In the example of FIG. 13, first provision port 301 and second provision port 302 are provided opposite to each other in the vehicle body of FCV 1. In the example of FIG. 13, first provision port 301 and second provision port 302 are disposed opposite to each other in the X axis direction. In the example of FIG. 13, when FCV 1 is viewed from directly above, first provision port 301 is provided on the left side and second provision port 302 is provided on the right side.

In the fourth embodiment, first indicator 101 is presented on the side on which first provision port 301 is located (i.e., the left side). Second indicator 102 is presented on the side on which second provision port 302 is located (i.e., the right side). For example, in the fourth embodiment, first indicator 101 and second indicator 102 are presented in any of manners shown in FIGS. 10 to 12. In each of FIGS. 10 to 12, first indicator 101 is presented on the left side and second indicator 102 is presented on the right side.

When the user wishes to provide hydrogen to hydrogen tank 28, the user may be unable to immediately recognize whether first provision port 301 is provided on the left side or right side of FCV 1. When the user wishes to provide electric power to battery 40, the user may be unable to immediately recognize whether second provision port 302 is provided on the left side or right side of FCV 1. When the user cannot recognize the positions of first provision port 301 and second provision port 302 in such a case, the user may visually recognize first indicator 101 and second indicator 102. By understanding the positional relation between first indicator 101 and second indicator 102, the user can know a positional relation between first provision port 301 and second provision port 302. Therefore, with FCV 1 of the fourth embodiment, the user can recognize the position of first provision port 301 and the position of second provision port 302.

Figure 14:
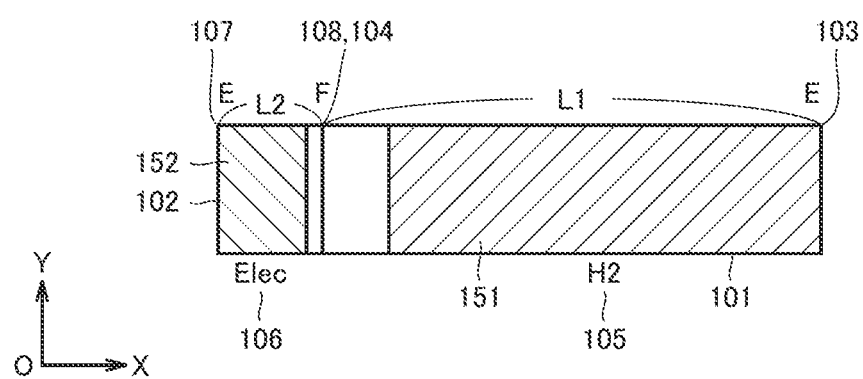
FIG. 14 shows exemplary indicators presented by a display device according to a fifth embodiment.

It should be noted that as a modification of the fourth embodiment, first provision port 301 may be provided on the right side and second provision port 302 may be provided on the left side when FCV 1 is viewed directly from above. In this modification, first indicator 101 is presented on the side on which first provision port 301 is located (i.e., the right side). Second indicator 102 is presented on the side on which second provision port 302 is located (i.e., the left side). For example, display device 84 of this modification presents first indicator 101 and second indicator 102 in a below-described manner shown in FIG. 14. In FIG. 14, second indicator 102 is presented on the left side and first indicator 101 is presented on the right side.

Also when display device 84 presents first indicator 101 and second indicator 102 in the manner shown in FIG. 14 as in the modification of the fourth embodiment, the same effect as that of the fourth embodiment can be exhibited.

Fifth Embodiment

In each of the first to fourth embodiments, it has been described that FCV 1 can travel in one of the four modes.

Moreover, in each of the first to fourth embodiments, it has been described that display device 84 presents first indicator 101 and second indicator 102 in the same manner of presentation regardless of a set mode. In a fifth embodiment, display device 84 switches the manner of presentation of each of first indicator 101 and second indicator 102 in accordance with a set mode. In other words, in accordance with electric power used by driving device 13 in the electric power output from FC system 20 and the electric power output from battery 40, display device 84 switches presentation positions of first indicator 101 and second indicator 102.

As described with reference to FIG. 2 and the like, the four modes of the present embodiment are the FC mode, the FCEV mode, the EV mode, and the CHG mode. The FC mode is a mode in which the electric power output from FC system 20 is used with precedence over the electric power output from battery 40. The EV mode is a mode in which the electric power output from battery 40 is used with precedence over the electric power output from FC system 20. The FCEV mode is a mode in which both the electric power output from battery 40 and the electric power output from FC system 20 are used. The CHG mode is a mode in which electric power is provided to battery 40 based on electric power output from FC system 20.

When the FC mode is set, display device 84 presents first indicator 101 on the left side as viewed from the user and second indicator 102 on the right side as viewed from the user. Such presentation is made as described with reference to each of FIGS. 10 to 12.

FIG. 14 is a diagram showing first indicator 101 and second indicator 102 presented by display device 84 when the EV mode is set. In the example of FIG. 14, first indicator 101 is presented on the right side as viewed from the user and second indicator 102 is presented on the left side as viewed from the user. In the example of FIG. 14, first gauge image 151 is changed to be increased in the negative direction of the X axis in response to an increase in the FC remaining amount due to supply of hydrogen. On the other hand, first gauge image 151 is changed to be decreased in the positive direction of the X axis in response to a decrease in the FC remaining amount due to traveling of FCV 1 or the like. Further, second gauge image 152 is changed to be increased in the positive direction of the X axis in response to an increase in the battery remaining amount due to charging of battery 40. On the other hand, second gauge image 152 is changed to be decreased in the negative direction of the X axis in response to a decrease in the battery remaining amount due to traveling of FCV 1 or the like.

Further, in the example of FIG. 14, the coordinate of full position 108 of second indicator 102 in the X axis direction coincides with the coordinate of full position 104 of first indicator 101 in the X axis direction.

Figure 15:
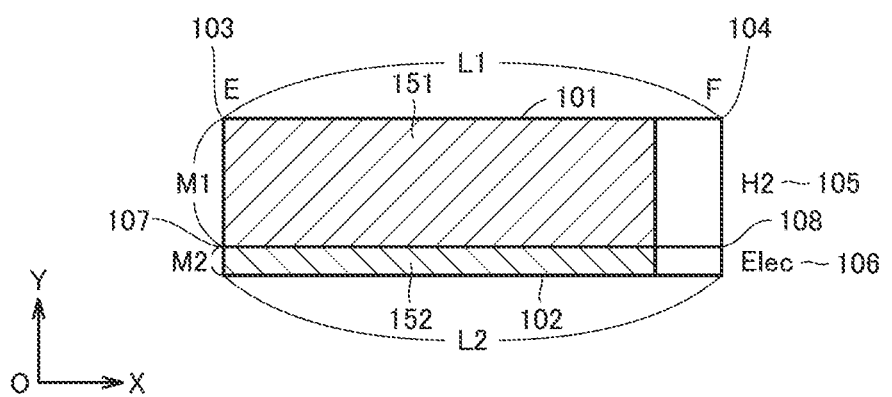
FIG. 15 shows exemplary indicators presented by the display device according to the fifth embodiment.

FIG. 15 is a diagram showing first indicator 101 and second indicator 102 presented by display device 84 when the FCEV mode is set. In FIG. 8, it has been illustratively described that first indicator 101 and second indicator 102 are separated from each other. In FIG. 15, first indicator 101 and second indicator 102 are joined to each other. Further, when first indicator 101 and second indicator 102 are presented in the manner of FIG. 15 and the FCEV mode is set, both first gauge image 151 and second gauge image 152 are presented to be gradually decreased based on traveling of FCV 1.

It should be noted that when the FCEV mode is set, display device 84 may present first indicator 101 and second indicator 102 in the manner shown in FIG. 8. Alternatively, when the FCEV mode is set, display device 84 may present first indicator 101 and second indicator 102 in the manner shown in FIG. 9. Alternatively, when the FCEV mode is set, display device 84 may present first indicator 101 and second indicator 102 in the manner shown in FIG. 9 with first indicator 101 and second indicator 102 being joined to each other.

Figure 16:
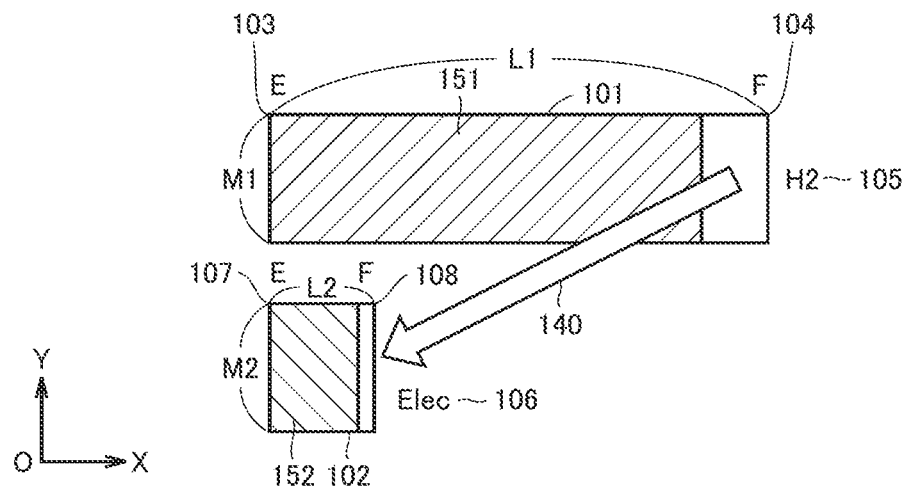
FIG. 16 shows exemplary indicators presented by the display device according to the fifth embodiment.

FIG. 16 is a diagram showing first indicator 101 and second indicator 102 presented by display device 84 when the CHG mode is set. In FIG. 16, an arrow image 140 is further presented at first indicator 101 and second indicator 102 described with reference to FIG. 8. A start point of the arrow indicated by arrow image 140 overlies first indicator 101 and an end point of the arrow overlies second indicator 102.

As described above, the CHG mode is a mode in which battery 40 is provided with electric power based on electric power output from FC system 20 (i.e., a mode in which battery 40 is charged by outputting electric power from FC system 20). Arrow image 140 is an image indicating that battery 40 is charged by outputting electric power from FC system 20. It should be noted that the image is not limited to arrow image 140 and may be a different image as long as the image indicates that battery 40 is charged by outputting electric power from FC system 20. For example, instead of arrow image 140, display device 84 may present a text image indicating "battery 40 is charged by outputting electric power from FC system 20". The text image may be, for example, a text image "CHARGING".

Figure 17:
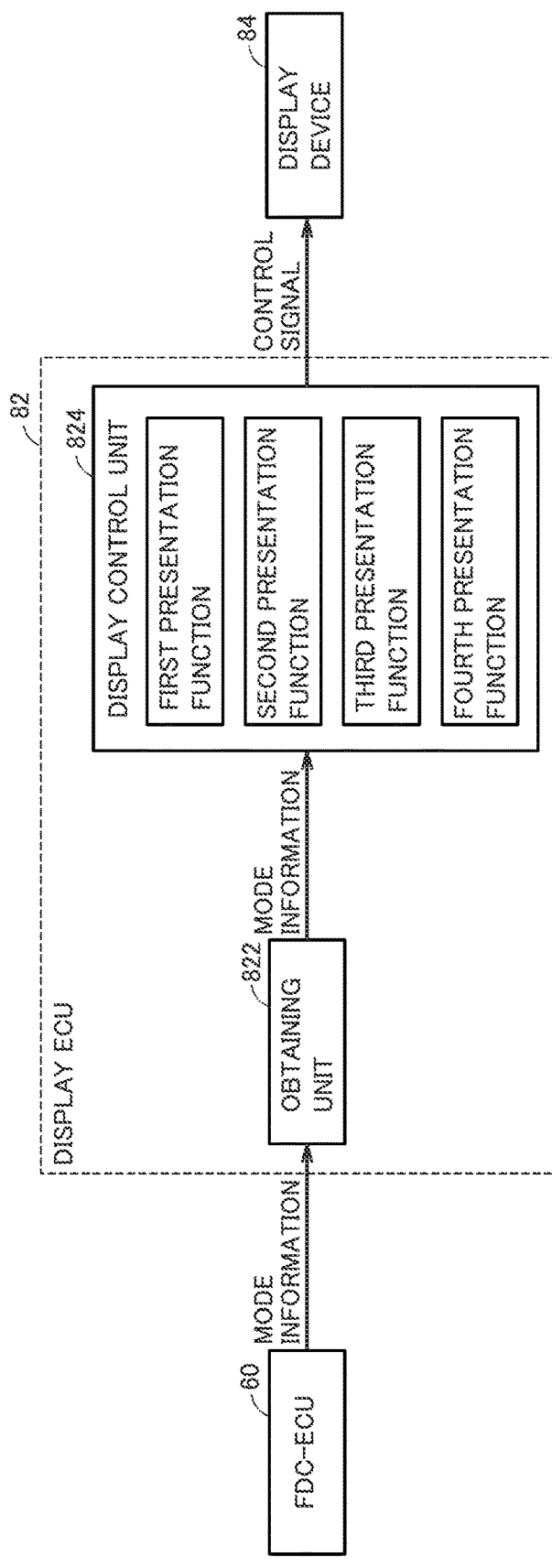
FIG. 17 is a diagram showing an exemplary functional configuration of a display ECU.

FIG. 17 is a diagram showing an exemplary functional configuration and the like of display ECU 82 of the present embodiment. Display ECU 82 has functions of an obtaining unit 822 and a display control unit 824. Display control unit 824 has a first presentation function, a second presentation function, a third presentation function, and a fourth presentation function.

FDC-ECU 60 transmits mode information stored in the RAM of FDC-ECU 60 to display ECU 82. Obtaining unit 822 obtains the mode information from FDC-ECU 60. Obtaining unit 822 transmits the obtained mode information to display control unit 824.

Display control unit 824 specifies a currently set traveling mode based on mode information transmitted from obtaining unit 822. Display device 84 is caused to present indicators by way of a presentation function corresponding to the traveling mode specified by display control unit 824. Display control unit 824 transmits, to display device 84, a control signal based on the presentation function corresponding to the traveling mode. Display device 84 presents the indicators based on the control signal. The first presentation function is a function of presenting indicators for the FC mode. The indicators for the FC mode are, for example, any indicators shown in FIGS. 10 to 12. The second presentation function is a function of presenting indicators for the EV mode. The indicators for the EV mode are, for example, the indicators shown in FIG. 14. The third presentation function is a function of presenting indicators for the FCEV mode. The indicators for the FCEV mode are, for example, the indicators shown in FIG. 15. The fourth presentation function is a function of presenting indicators for the CHG mode. The indicators for the CHG mode are, for example, the indicators shown in FIG. 16.

Figure 18:
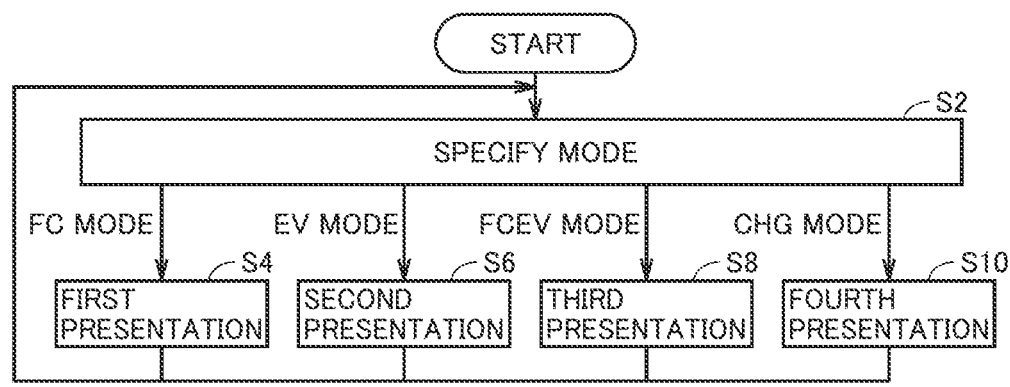
FIG. 18 is a flowchart showing a flow of a main process performed by the display ECU.

FIG. 18 is a diagram showing a flow of a main process performed by display ECU 82. The process of FIG. 18 is started when FCV 1 is activated, for example. In a step S2, display control unit 824 of display ECU 82 specifies a currently set mode based on mode information from FDC-ECU 60. When it is determined in step S2 that the set mode is the FC mode, the process proceeds to a step S4. When it is determined in step S2 that the set mode is the EV mode, the process proceeds to a step S6. When it is determined in step S2 that the set mode is the FCEV mode, the process proceeds to a step S8. When it is determined in step S2 that the set mode is the CHG mode, the process proceeds to a step S10.

In step S4, display device 84 performs first presentation. The first presentation is presentation performed by way of the first presentation function (presentation for the FC mode). In step S6, display device 84 performs second presentation. The second presentation is presentation performed by way of the second presentation function (presentation for the EV mode). In step S8, display device 84 performs third presentation. The third presentation is presentation performed by way of the third presentation function (presentation for the FCEV mode). In step S10, display device 84 performs fourth presentation. The fourth presentation is presentation performed by way of the fourth presentation function (presentation for the CHG mode).

[Conclusion]

(1) In the fourth embodiment, as described with reference to FIG. 18 and the like, display device 84 switches the manner of presentation of first indicator 101 and second indicator 102 in accordance with electric power used by driving device 13 in the electric power output from the FC and the electric power output from battery 40. According to such a configuration, by visually recognizing the manner of presentation of first indicator 101 and second indicator 102, the user can recognize the electric power used by driving device 13.

(2) Generally, the user recognizes "the electric power having the remaining amount indicated by the indicator presented on the left side of display device 84 is used with precedence over the electric power having the remaining amount indicated by the indicator presented on the right side" (hereinafter, this recognition will be referred to as "recognition A"). Therefore, in the present embodiment, when the FC mode in which the electric power output from FC system 20 is used with precedence over the electric power output from battery 40 is set, display device 84 presents first indicator 101 indicating the FC remaining amount on the left side as shown in FIGS. 10 to 12. According to such a configuration, based on the above-described recognition A, the user can recognize that the electric power output from FC system 20 is used with precedence over the electric power output from battery 40.

(3) When the EV mode in which the electric power output from battery 40 is used with precedence over the electric power output from FC system 20 is set, display device 84 presents second indicator 102 indicating the battery remaining amount on the left side as shown in FIG. 14. According to such a configuration, based on the above-described recognition A, the user can recognize that the electric power output from battery 40 is used with precedence over the electric power output from FC system 20.

(4) When the FCEV mode in which both the electric power output from battery 40 and the electric power output from FC system 20 are used is set, display device 84 presents first indicator 101 and second indicator 102 in the manner shown in FIG. 15. In the example of FIG. 15, display device 84 presents first indicator 101 and second indicator 102 side by side in the Y axis direction. In the FCEV mode, in response to consumption of both of the FC power and the battery power, first gauge image 151 is presented to be decreased and second gauge image 152 is presented to be decreased. According to such a configuration, the user can recognize that both the electric power output from battery 40 and the electric power output from FC system 20 are used.

(5) When the CHG mode in which battery 40 is charged by outputting electric power from FC system 20 is set, display device 84 presents first indicator 101 and second indicator 102 in the manner shown in FIG. 16. In the example of FIG. 16, display device 84 presents first indicator 101 and second indicator 102 side by side in the Y axis direction. Further, display device 84 presents arrow image 140. Arrow image 140 is an image indicating that battery 40 is charged by outputting electric power from FC system 20. According to such a configuration, the user can recognize that battery 40 is provided with electric power based on the electric power output from FC system 20.

Other Embodiments (1) In each of the foregoing embodiments, as described with reference to FIG. 5, it has been described that the amount of electric power that can be output from FC system 20 when hydrogen tank 28 is full of hydrogen is larger than the amount of electric power that can be output from battery 40 when battery 40 is fully charged. However, FCV 1 may employ the following configuration: the amount of electric power that can be output from the battery when battery 40 is fully charged is larger than the amount of electric power that can be output from FC system 20. At least part of the configurations described in the above embodiments may be applied to FCV 1 employing such a configuration.

(2) In each of the foregoing embodiments, it has been described that each of first indicator 101 and second indicator 102 has a rectangular shape. However, each of first indicator 101 and second indicator 102 may have a different shape. For example, each of first indicator 101 and second indicator 102 may have an arc shape. In some embodiments, when each of first indicator 101 and second indicator 102 has a different shape, the presentation area of first indicator 101 may be larger than the presentation area of second indicator 102.

(3) In each of the foregoing embodiments, it has been described that each of first indicator 101 and second indicator 102 extends in the X axis direction. However, the extending direction may be a different direction. For example, each of first indicator 101 and second indicator 102 may extend in the Y axis direction. In some embodiments, when each of first indicator 101 and second indicator 102 extends in a different direction, the presentation area of first indicator 101 may be larger than the presentation area of second indicator 102.

(4) In each of the foregoing embodiments, it has been described that first indicator 101 indicates the remaining amount of electric power to be output from FC system 20. However, first indicator 101 may indicate the remaining amount of hydrogen stored in hydrogen tank 28. The "remaining amount of electric power to be output from FC system 20" and the "remaining amount of hydrogen stored in hydrogen tank 28" may have the same meaning. The "remaining amount of electric power to be output from FC system 20" may be different in concept from the "remaining amount of hydrogen stored in hydrogen tank 28".

(5) In each of the foregoing embodiments, it has been described that first indicator 101 and second indicator 102 are presented side by side. However, first indicator 101 and second indicator 102 may not be presented side by side. For example, first indicator 101 may be presented at an end of the presentation region of display device 84 and second indicator 102 may be presented at an opposite end of the presentation region of display device 84.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:
a fuel cell system including a fuel tank that stores a fuel;
a power storage device chargeable with electric power supplied from outside;
a driving device that generates traveling power by using at least one of electric power output from the fuel cell system and electric power output from the power storage device; and
a display device that presents an indicator indicating a remaining amount of electric power to be output from the fuel cell system and an indicator indicating a remaining amount of electric power to be output from the power storage device, wherein
a first amount of electric power that is able to be output from the fuel cell system when the fuel tank is full is different from a second amount of electric power that is able to be output from the power storage device when the power storage device is fully charged, and
a presentation area of an indicator indicating a remaining amount of a larger amount of electric power of the first amount of electric power and the second amount of electric power is larger than a presentation area of an indicator indicating a remaining amount of a smaller amount of electric power of the first amount of electric power and the second amount of electric power.

2. The vehicle according to claim 1, wherein
a first indicator and a second indicator are presented side by side, the first indicator serving as the indicator indicating the remaining amount of the larger amount of electric power, the second indicator serving as the indicator indicating the remaining amount of the smaller amount of electric power, and
the first indicator and the second indicator are presented to extend in a first direction.

3. The vehicle according to claim 2, wherein
the first indicator and the second indicator are presented side by side in a second direction orthogonal to the first direction, and
a length of the first indicator in the second direction orthogonal to the first direction is longer than a length of the second indicator in the second direction.

4. The vehicle according to claim 2, wherein
the first indicator and the second indicator are presented side by side in a second direction orthogonal to the first direction, and
a length of the first indicator in the first direction is longer than a length of the second indicator in the first direction.

5. The vehicle according to claim 3, wherein
the first indicator includes a first gauge image that is decreased in response to a decrease in the remaining amount indicated by the first indicator,
the second indicator includes a second gauge image that is decreased in response to a decrease in the remaining amount indicated by the second indicator, and
a zero position indicating a state with a value of 0 in the first gauge image coincides with a zero position indicating a state with a value of 0 in the second gauge image in a coordinate of the first direction.

6. The vehicle according to claim 2, wherein
the first indicator includes a first gauge image that is decreased in response to a decrease in the remaining amount indicated by the first indicator,
the second indicator includes a second gauge image that is decreased in response to a decrease in the remaining amount indicated by the second indicator,
the first indicator and the second indicator are presented side by side in the first direction,
a length of the first indicator in the first direction is longer than a length of the second indicator in the first direction, and
a zero position indicating a state with a value of 0 in the first gauge image coincides with a zero position indicating a state with a value of 0 in the second gauge image in a coordinate of the first direction.

7. The vehicle according to claim 6, further comprising:
a first provision port via which the fuel is to be provided; and
a second provision port provided at a position opposite to a position of the first provision port, the electric power being to be provided via the second provision port, wherein
the first indicator is presented on a side on which the first provision port is located, and
the second indicator is presented on a side on which the second provision port is located.

8. The vehicle according to claim 2, wherein
the first indicator includes
a first gauge image that is decreased in response to a decrease in the remaining amount indicated by the first indicator,
a first full position indicating a full state in the first gauge image, and
a first zero position indicating a state with a value of 0 in the first gauge image,
the second indicator includes
a second gauge image that is decreased in response to a decrease in the remaining amount indicated by the second indicator,
a second full position indicating a full state in the second gauge image, and
a second zero position indicating a state with a value of 0 in the second gauge image, and
the display device switches a manner of presentation of each of the first indicator and the second indicator in accordance with electric power used by the driving device.

9. The vehicle according to claim 8, wherein when a first mode is set, the display device presents the first indicator and the second indicator side by side in the first direction, presents the first indicator on a left side as viewed from a user, and presents the second indicator on a right side as viewed from the user, the first mode being a mode in which the electric power having the remaining amount indicated by the first indicator is used with precedence over the electric power having the remaining amount indicated by the second indicator.

10. The vehicle according to claim 8, wherein when a second mode is set, the display device presents the first indicator and the second indicator side by side in the first direction, presents the second indicator on a left side as viewed from a user, and presents the first indicator on a right side as viewed from the user, the second mode being a mode in which the electric power having the remaining amount indicated by the second indicator is used with precedence over the electric power having the remaining amount indicated by the first indicator.

11. The vehicle according to claim 8, wherein when a third mode is set, the display device presents the first indicator and the second indicator side by side in a direction orthogonal to the first direction, the third mode being a mode in which both the electric power having the remaining amount indicated by the first indicator and the electric power having the remaining amount indicated by the second indicator are used.

12. The vehicle according to claim 8, wherein
the fuel is hydrogen,
the larger amount of electric power is the electric power to be output from the fuel cell system,
the smaller amount of electric power is the electric power to be output from the power storage device, and
when a fourth mode is set, the display device presents an image indicating that the power storage device is charged by outputting the electric power from the fuel cell system, the fourth mode being a mode in which the power storage device is charged by outputting the electric power from the fuel cell system.

13. The vehicle according to claim 1, wherein
the fuel is hydrogen,
the larger amount of electric power is the electric power to be output from the fuel cell system, and
the smaller amount of electric power is the electric power to be output from the power storage device.

* * * * *